C. A. HUSSEY.
Pedal-Switch for Controlling Electric-Motors.
No. 210,939. Patented Dec. 17, 1878.
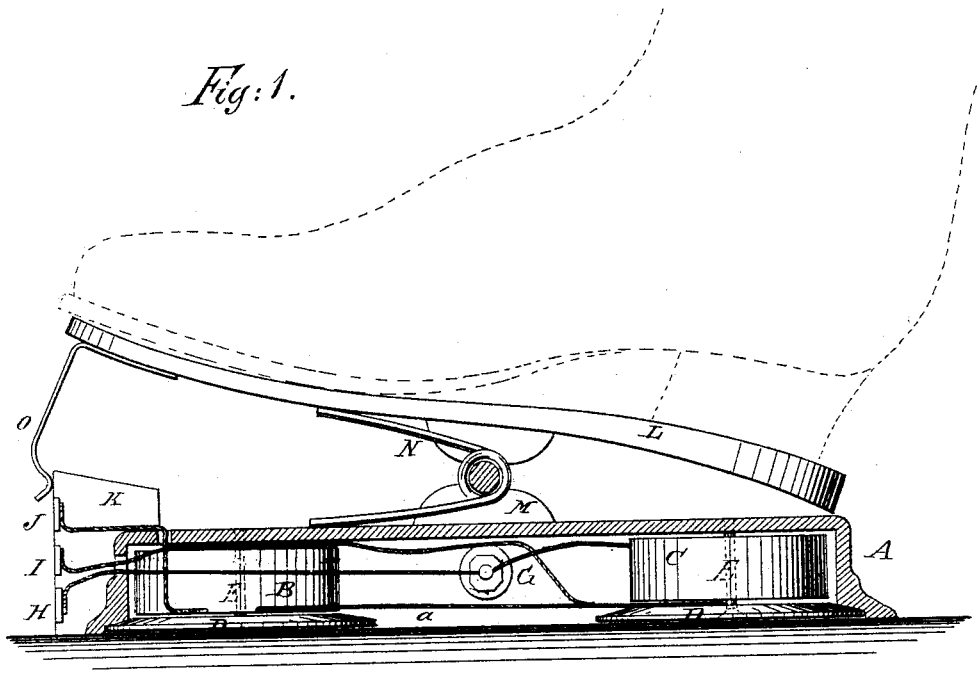
Fig: 1.
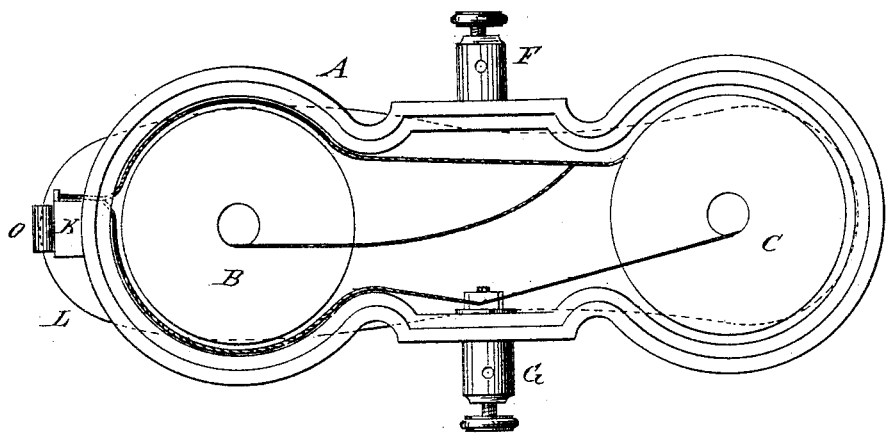
Fig: 2.
WITNESSES:
Chas. N. Nida
C. Sedgwick
INVENTOR:
C. A. Hussey
BY
ATTORNEYS.

UNITED STATES PATENT OFFICE.

CHARLES A. HUSSEY, OF NEW YORK, N. Y.

IMPROVEMENT IN PEDAL-SWITCHES FOR CONTROLLING ELECTRIC MOTORS.

Specification forming part of Letters Patent No. 210,939, dated December 17, 1878; application filed November 8, 1878.

*To all whom it may concern:*

Be it known that I, CHARLES A. HUSSEY, of the city, county, and State of New York, have invented a new and Improved Pedal for Controlling Electric Motors, of which the following is a specification:

Figure 1 is a vertical longitudinal section of the pedal. Fig. 2 is an inverted plan view.

Similar letters of reference indicate corresponding parts.

My invention consists in a hollow base containing resistance-coils, and having attached to it a series of insulated metallic strips, connected with the resistance-coils and with a binding-post for receiving one of the battery-wires; also, in a pedal pivoted to the hollow base and carrying a contact-spring placed in communication with another binding-post, and capable of touching either of the insulated strips on the base as the pedal is moved by the foot.

The object of the invention is to furnish a means for controlling the electrical current by a movement of the foot, so that the hands may be free to manipulate the machine propelled by the motor.

In the drawing, A is a base, which is chambered to receive two or more resistance-coils, B C, which are clamped in place by disks D and screws E, which pass through the coils into the upper part of the base.

Attached to opposite sides of the base are binding-posts F G. The binding-post F is in electrical communication with the metallic base-piece A. The other binding-post, G, is connected with the coil C, and also with a metallic strip, H, which is the lowest of three metallic strips, H I J, that are dovetailed into an insulating-block, K, secured to the end of the base A.

The strip I is connected with the coil C, and the strip J is connected with the coil B.

The coils B C are connected with each other by the wire *a*.

A pedal, L, is pivoted near the center between the ears M, that project from the top of the base A. Its toe is raised by a spring, N, which is retained in place by the pivot of the pedal.

A contact-spring, O, is secured to the toe of the pedal, and is bent downward and curved, so as to present a rounded face to the strips H I J, or the block K which supports them.

One of the battery-wires is connected with the motor in connection with which the pedal is used, and the motor is connected with one of the binding-posts, while the other battery-wire is connected with the other binding-post. When the pedal is in its normal position the spring O rests upon the block K.

When it is desired to start the motor the toe of the pedal is depressed, when the spring O, by contact with the strip J, establishes an electrical circuit through both resistance-coils and through the motor, the current passing in the device from the binding-post F through the pedal L, spring O, strip J, coil B, connecting-wire *a*, and coil C to the binding-post G.

Should the current remaining after passage through both resistance-coils prove insufficient, a farther depression of the pedal brings the spring O into contact with the strip I, when the current will pass from the pedal through the coil C only. A still farther depression of the pedal brings the spring O into contact with the strip H, which is connected directly with the binding-post G. In this case the current flows directly from the battery to the motor, giving the maximum effect of the battery in the motor.

It is obvious that by connecting the commutator with a series of battery-cells, so that a greater or less number of cells may be thrown into the circuit, the resistance-coils may be dispensed with. For this reason, I do not limit or confine myself to the exact construction herein described.

Having thus fully described my invention, I claim as new and desire to secure by Letters Patent—

1. The combination, with the base A, having connected resistance-coils B C, of the insulated strips H I J, posts F G, block K, spring O, and the spring-supported pedal L, all arranged as and for the purpose specified.

2. The spring-acted pedal L, the hollow base A, one or more resistance-coils, B C, and a commutator, in combination, substantially as shown and described.

CHARLES A. HUSSEY.

Witnesses:
GEO. M. HOPKINS,
C. SEDGWICK.